(12) United States Patent
Sekiguchi et al.

(10) Patent No.: US 6,434,553 B1
(45) Date of Patent: Aug. 13, 2002

(54) FILE PREFETCH CONTROL METHOD FOR COMPUTER SYSTEM

(75) Inventors: Tomoki Sekiguchi, Yokohama; Toshiaki Arai, Machida; Shigeo Takasaki, Sagamihara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/319,737

(22) PCT Filed: Dec. 13, 1996

(86) PCT No.: PCT/JP96/03646

§ 371 (c)(1),
(2), (4) Date: Jul. 15, 1999

(87) PCT Pub. No.: WO98/26352

PCT Pub. Date: Jun. 18, 1998

(51) Int. Cl.[7] ............................................. G06F 17/30
(52) U.S. Cl. ........................ 707/4; 707/2; 707/3; 707/10
(58) Field of Search ............................ 707/1, 2, 3, 4, 707/10

(56) References Cited

U.S. PATENT DOCUMENTS 4,384,325 A * 5/1983 Slechta et al. ................. 707/3
5,333,246 A * 7/1994 Nagasaka ....................... 707/1

FOREIGN PATENT DOCUMENTS

| JP | 06-059953 | * 3/1994 | .......... G06F/17/30 |
| JP | 06110926 | 4/1994 | |
| JP | 06119219 | 4/1994 | |
| JP | 08087526 | 4/1996 | |

OTHER PUBLICATIONS

T. Berners–Lee, et al, The World–Wide Web, Communications of the ACM, Aug. 1994, vol. 37, No. 8, pp. 76–82.
Chapter 7, The Filesystem, Structure and Overview, Section 7.1, pp. 187–221.

* cited by examiner

*Primary Examiner*—Jean M. Corrielus
(74) *Attorney, Agent, or Firm*—Antonelli, Terry, Stout & Kraus, LLP (57) ABSTRACT

A file prefetch control method including the steps of dividing a file into a plurality of partial files furnished with a partial file name each, and converting a request to access any one of the partial files using the corresponding partial file name into a request to access the entire file to which the requested partial file belongs, whereby the file as a whole is read out. When multiple files are prefetched in this manner, the throughput of a file system is enhanced, the number of access operations to a secondary memory is reduced, and the wait time for access to partial files is shortened.

4 Claims, 10 Drawing Sheets

FIG. 9 ic disk
FILE PREFETCH CONTROL METHOD FOR COMPUTER SYSTEM

TECHNICAL FIELD

The present invention relates to a file prefetch control method for use with a computer system. More particularly, the invention relates to a method for controlling a processor of a computer system prefetching files.

BACKGROUND ART

Generally, the operating system (OS) of a computer builds a file system in a randomly accessible secondary memory such as magnetic disks. The operating system reads part of disk contents into a main memory for various uses.

A file system of the operating system described in "The Design and Implementation of the 4.3 BSD Operating System" (Samuel J. Leffler et al., Addison Wesley, pp. 187–221) has its disk volume divided into a plurality of physical disk blocks, the disk volume having been designated at th time of a file system build-up. Under the operating system, file storage regions are assigned to individual disk blocks thus prepared. Disk contents are stored into the main memory in units of disk blocks. File read and write operations are carried out using buffers secured in a storage area of the main memory. In addition, the operating system leaves as much content of the most recently accessed disk regions as possible in the main memory. Such measures allow the operating system to minimize the number of write and read operations to and from disks upon access to files, whereby the throughput of the file system is enhanced and a disk access wait time is shortened.

With the above-described type of file system, a write or read operation to or form a file takes place as follows: A disk block containing target data is calculated based on a target file to be accessed and on an offset relative to the target data to be reached. A check is made to see if the content of the target disk block already exists in a file system cache within the main memory. If the block in question is found to exist, the write or read operation is performed to or from the cache. The steps above eliminate an output or input to or from the physical disks, whereby the input/output wait time of the processor is reduced. If the target disk block is not found in the main memory, a buffer is allocated in the main memory and the content of the target block is read into the buffer.

It is common knowledge that the throughput of a file system is higher, the greater the size of each of disk blocks, i.e., units in which files are assigned to storage regions on disks and in which data are written and read to and from the disk storage regions. However, enlarging the disk block size tends to increase regions that cannot be utilized on disks. Illustratively, if a large disk block is assigned in its entirety to a small file or to a small region at the end of a file, that area within the disk block which does not hold file contents is uselessly occupied.

To avert such wasteful practice, the operating system generally divides disk blocks. That is, a file or the last disk block of a file smaller in size than a full block is stored into one of small regions created by dividing a disk block. This technique has been proposed in order to minimize wasteful uses of disk regions.

One disadvantage of the above technique is that individual small regions derived from the division of a disk block accommodate mutually irrelevant files or fragments of such files. Each of the divided small regions is handled as a single disk block. The larger the number of divided disk blocks, the smaller the size of units in which disks are accessed. In particular, if a large number of small files exist, the throughput of the file system in question can deteriorate.

Conventionally, users are not allowed to define those allocated block locations on disks which are to retain contents of small files. Where a specific file whose fragments are distributed in a plurality of disk blocks tends to be accessed exclusively, a disk access time can be appreciably long because the disk blocks holding the contents of the entire file are dispersed over the disks.

Most operating systems perform prefetch operations on a secondary memory by resorting to asynchronous input and output manipulations in order to boost a cache hit rate of the file system in use. Under this scheme, the operating system retains a logical disk block number of the file most recently read into the main memory. If a pointer for the next access operation points to the logical disk block next to the logical disk block whose number has been retained, the operating system assumes the occurrence of sequential file access and reads in advance a plurality of subsequent logical disk blocks into the main memory through asynchronous input and output operations. Logical disk blocks refer to component disk regions of a file divided by the file system in increments of a predetermined disk block size.

The above prefetch scheme is arranged to judge whether the access operation about to take place is sequential or not on the basis of the most recently read logical block and of the logical disk block to be read this time. It follows that the scheme is effective only in the case of sequential access to a given file. Prefetch operations are not performed conventionally on a plurality of files likely to be read in sequence. Thus, it can take time to read a plurality of files even if they tend to be read consecutively.

It is therefore an object of the present invention to provide a method for prefetching a plurality of files that are accessed continuously.

It is another object of the present invention to provide a method for allowing a large number of small files efficiently to utilize storage region of a memory, whereby the throughput of a file system is prevented from deteriorating.

DISCLOSURE OF THE INVENTION

In carrying out the invention and according to one aspect thereof, there is provided a file prefetch control method for use with a computer system, including the steps of: dividing a file into a plurality of partial files furnished with a partial file name each; and converting a request to access any one of the partial files using the corresponding partial file name into a request to access the entire file to which the requested partial file belongs; whereby the file as a whole is read out. With this method, a plurality of partial files which tend to be read out consecutively are managed as a single file. A request to read any one of such partial files is arranged to trigger prefetch of the other partial files that are likely to be read out together.

According to another aspect of the invention, there is provided a file prefetch control method for use with a computer system, including the steps of: rendering a plurality of partial files consecutively into a single file; converting a request to access any one of the partial files into a request to access the single file to which the requested partial file belongs; whereby the whole file is read out. Even where a large number of small files exist, this method allows storage regions of the memory to accommodate the files efficiently and thereby prevents deterioration of the file system throughput.

BEST MODE FOR CARRYING OUT THE INVENTION

Embodiments of the invention will now be described with reference to the accompanying drawings.

Figure 1:
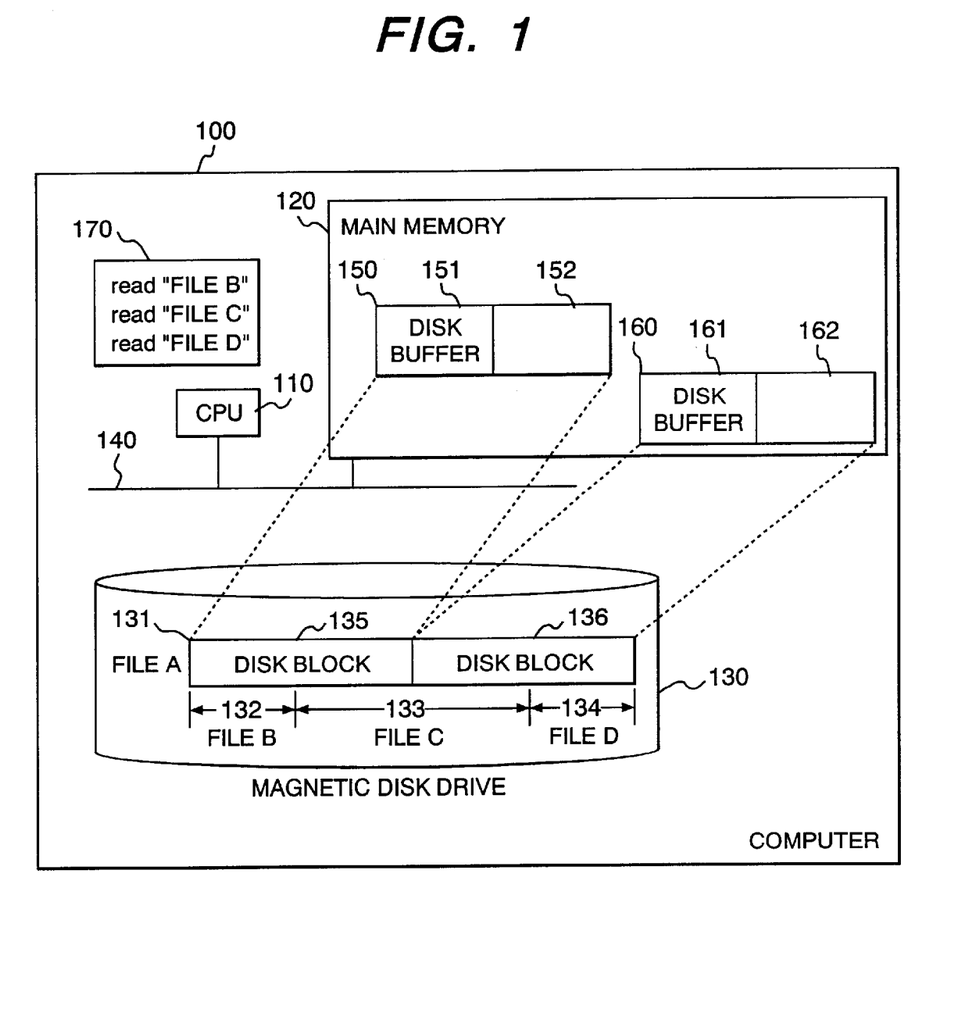
FIG. 1 is a block diagram of a computer system according to the invention.

FIG. 1 is a block diagram of a computer system to which a magnetic disk drive is connected. In FIG. 1, reference numeral 110 stands for a processor (CPU), 120 for a main memory and 130 for a randomly accessible magnetic disk drive. The components 110, 120 and 130 are interconnected by means of a bus 140 and exchange data therebetween over the bus. Although the setup of FIG. 1 shows a single processor 110 and a single disk drive 130, this is not limitative of the invention. The number of processors and that of disk drives are not limited by the invention.

Part of the data held on the magnetic disk drive 130 are retained in a cache of the main memory 120. The disk drive 130 retains a file 131 whose contents are held in disk blocks 135 and 136. A file name A is given to the file 131. The main memory 120 has disk buffers 150 and 160 corresponding to the disk blocks 135 and 136 respectively.

In the file A, regions 132, 133 and 134 are assigned file names B, C and D respectively. The contents corresponding to the file name B are held in a cache 151 in the disk buffer 150, the contents corresponding to the file name C are retained in caches 152 and 161, and the contents corresponding to the file name D are placed in a cache 162. If the files B, C and D are regarded collectively as a single file, they may be called partial files having partial file names B, C and D. As will be described later, the inventive method is characterized in that a request to reference a partial file is converted into a request to reference the whole file, the latter request being executed to prefetch the file in it entirety.

Figure 2:
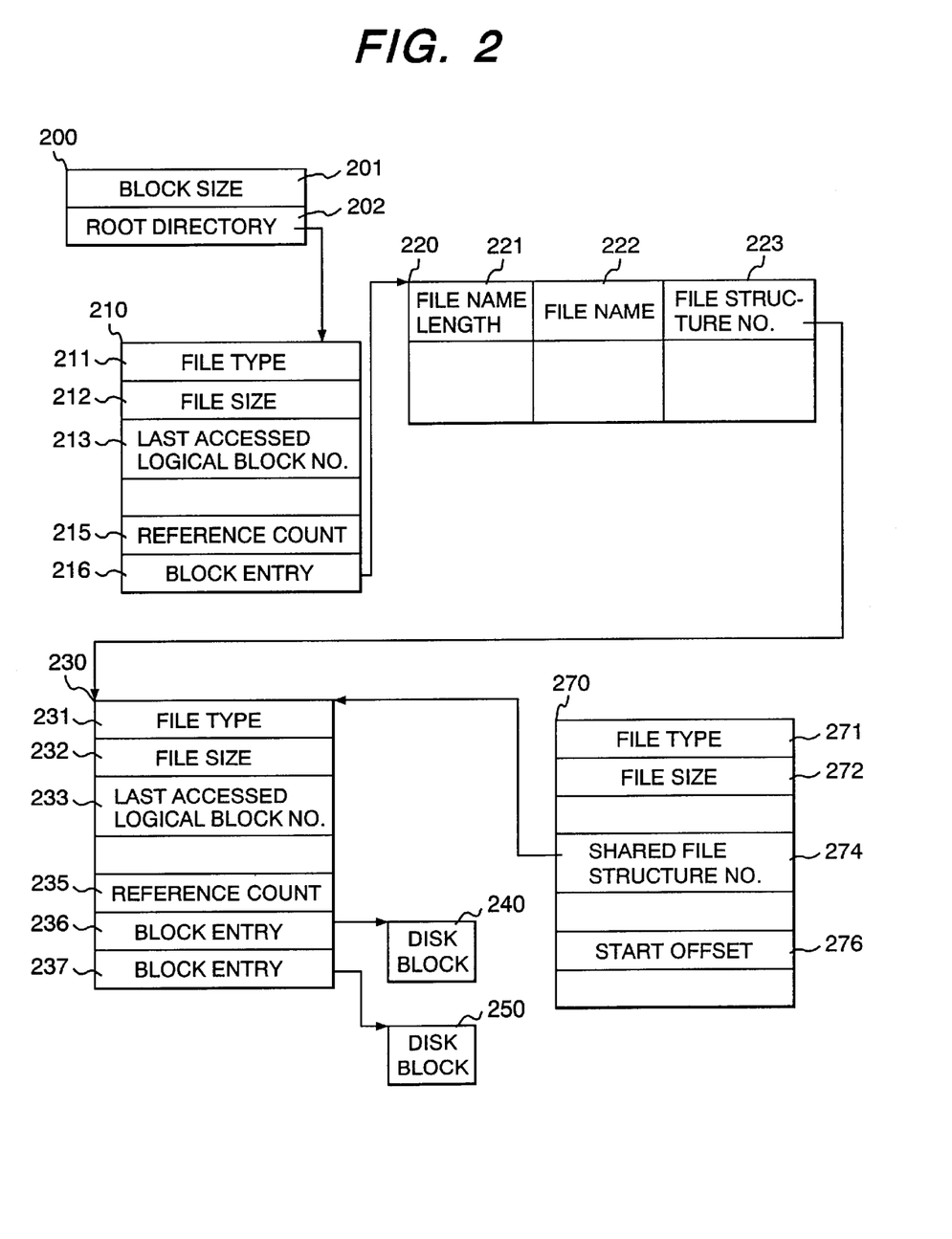
FIG. 2 is a schematic view showing a file system, a directory, and file data structures according to the invention.

FIG. 2 shows a data structure of a file system on the disk drive 130 according to the invention. In FIG. 2, reference numeral 200 denotes a file system structure representing a file system. The file system structure 200 is in a predetermined location on the disk drive 130 wherein the file system is established. The operating system detects the structure 200 on the disk drive 130 and, upon referencing it for the first time, copies the structure into the main memory for subsequent uses.

The file system structure 200 includes two components: a disk block size 201 indicating a unit in which to access disks of the file system, and a file structure number 202 of a file structure 210 serving as a file representing a root directory of the file system.

File structures 210 representing individual files in the file system 200 are in predetermined locations on the disk drive 130 wherein the file system 200 is established. The file structures 210 are each assigned a unique number allowing the operating system to find a desired file structure 210.

The file structures 210 each comprise a file type 211 of the file represented by the structure in question, a file size 212 of the file, a logical block number 213 of the most recently accessed block, a reference count 215 indicating the number of references to the file structure 210 in question, and a table entry 216 holding a disk block number of a disk block where the contents of the file are actually held. The number of table entries varies depending on the file size.

In the above example, each file structure 210 constitutes a file acting as a directory. For that reason, the file type 211 contains a value indicating that the file represented by the file structure 210 is actually a directory. Furthermore, the table entry 216 retains a disk block number of a disk block 220 constituting the contents of the file. The reference count of the file structure 210 is 1 because the file structure 210 is referenced solely by the file system structure 200.

The disk blocks retaining file contents are each assigned a unique number permitting the operating system to locate a target disk block. The logical block number is a number denoting one of partial blocks derived from the division of a file in increments of a disk block size stipulated by the file system.

The directory is a structure that puts the file system in hierarchical order. The contents of the directory file are prescribed by the operating system. The disk block 220 holding the contents of the file representing the directory indicated by the file structure 210 comprises: a file name length 221 indicating the length of a name of each file (or directory) contained in the directory, a file (or directory) name 222, and a file structure number 223 representing each file (or directory).

If the disk block 220 is in reality a file, then the file structure number 223 is that of a file structure 230 representing the file in question.

The file structure 230 comprises a file type 231, a file size 232, a logical block number 233 of the most recently accessed disk block, a reference count 235 of the file structure 230, and table entries 236 and 237 retaining disk block numbers of disk blocks (240 and 250) accommodating the file contents.

The file represented by a file structure 270 is a file composed of part of the file whose contents are indicated by the file structure 230. The file structure 270 includes a file type 271, a file size 272, a file structure number 274 of a file that actually holds the file contents, and a sharing start offset 276 specifying where the file contents of the file structure 270 are to start in the file indicated by the file structure number 274.

The file type 271 of the file structure 270 contains a value indicating that the contents of the file represented by the file structure 270 are shared by another file. The file structure number 274 designates a file structure number for the file structure 230. In this example, the contents of the file represented by the file structure 270 start from the location prescribed by the sharing start offset 276 of the file structure 270 and extend over the range designated by the file size 272 inside the file structure 270.

The reference count 235 of the file structure 230 is 2. That is because the file structure 230 is referenced by both the disk block 220 of the directory and the file structure 270.

Figure 3:
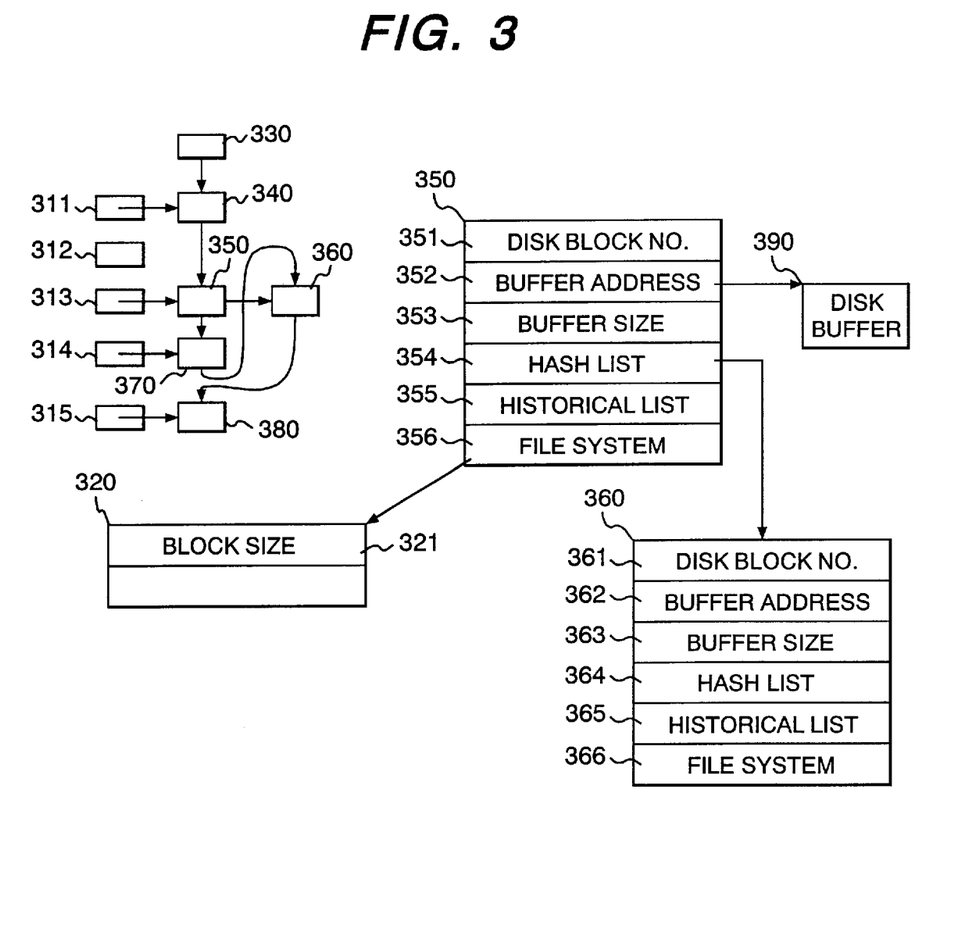
FIG. 3 is a schematic view of a data structure representing a disk buffer and a constitution of the disk buffer according to the invention.

FIG. 3 shows a data structure of the inventive file system in the main memory 120.

In every write or read operation to or from a file, the applicable disk contents are always written to a disk buffer within the main memory 120 before the operation is carried out on the buffer. Each disk buffer is assigned a disk buffer structure in which the disk buffer in question is described.

Shown in FIG. 3 is the data structure of the file system represented by the file system structure 200 in FIG. 2. In FIG. 3, a disk buffer 390 is described in terms of a disk buffer structure 350. The disk buffer structure 350 comprises: a disk block number 351 of the disk block held in the disk buffer 390, a buffer address 352 of the disk buffer 390, a buffer size 353 of the disk buffer 390; a hash list pointer 354 and a historical list pointer 355, two pointers constituting a list of disk buffer structures; and a pointer 356 pointing to a copy 320 in the main memory of the file system structure 200 wherein resides the file whose contents are held in the disk buffer 390. A disk buffer structure 360 has the same data structure as the disk buffer structure 350.

In checking to see if there exists in the main memory a disk buffer corresponding to a target disk block of a file to be accessed, the file system performs hashing using the relevant disk block number as the key. When hash values are obtained, the file system prepares hash lists of disk block structures by use of the obtained values as well as hash list pointers 354 and 364 in the disk block structures. Reference numerals 311 through 315 in FIG. 3 indicate tops of the hash lists corresponding to the hash values acquired by hashing with the disk block number.

For the disk buffer structure of the disk buffer retaining the data, a list sorted by disk buffer access history is constituted by historical list pointers 355 and 365. Illustratively, upon access to the disk buffer 390, the disk buffer structure 350 of the disk buffer 390 is temporarily removed from an access historical list 330 and attached to the end of a disk buffer structure 380. An address pointer of the access historical list 330 points to the top of the list. The access history list is arranged in such a manner that disk buffer structures of the least recently accessed disk buffers, i.e., the disk buffer structures of the disk buffers not referenced recently, come at the top of the list.

In FIG. 3, reference numerals 340, 350, 360, 370 and 380 denote disk buffer structures that make up two kinds of lists. The disk buffer structures 350 and 360 are connected to the same hash list. The hash list pointer 354 of the disk buffer structure 350 points to the disk buffer structure 360.

If, upon access to a file, there is no disk buffer corresponding to the disk block to be accessed in the main memory, a disk buffer needs to be allocated. If a necessary disk buffer cannot be allocated due to main memory shortage or some other constraints, the disk buffer allocated to the disk buffer structure at the top of the list 330 is released so as to meet the new demand. The recently referenced disk buffers are allowed to remain in the main memory to maintain the cache memory effect.

Figure 4:
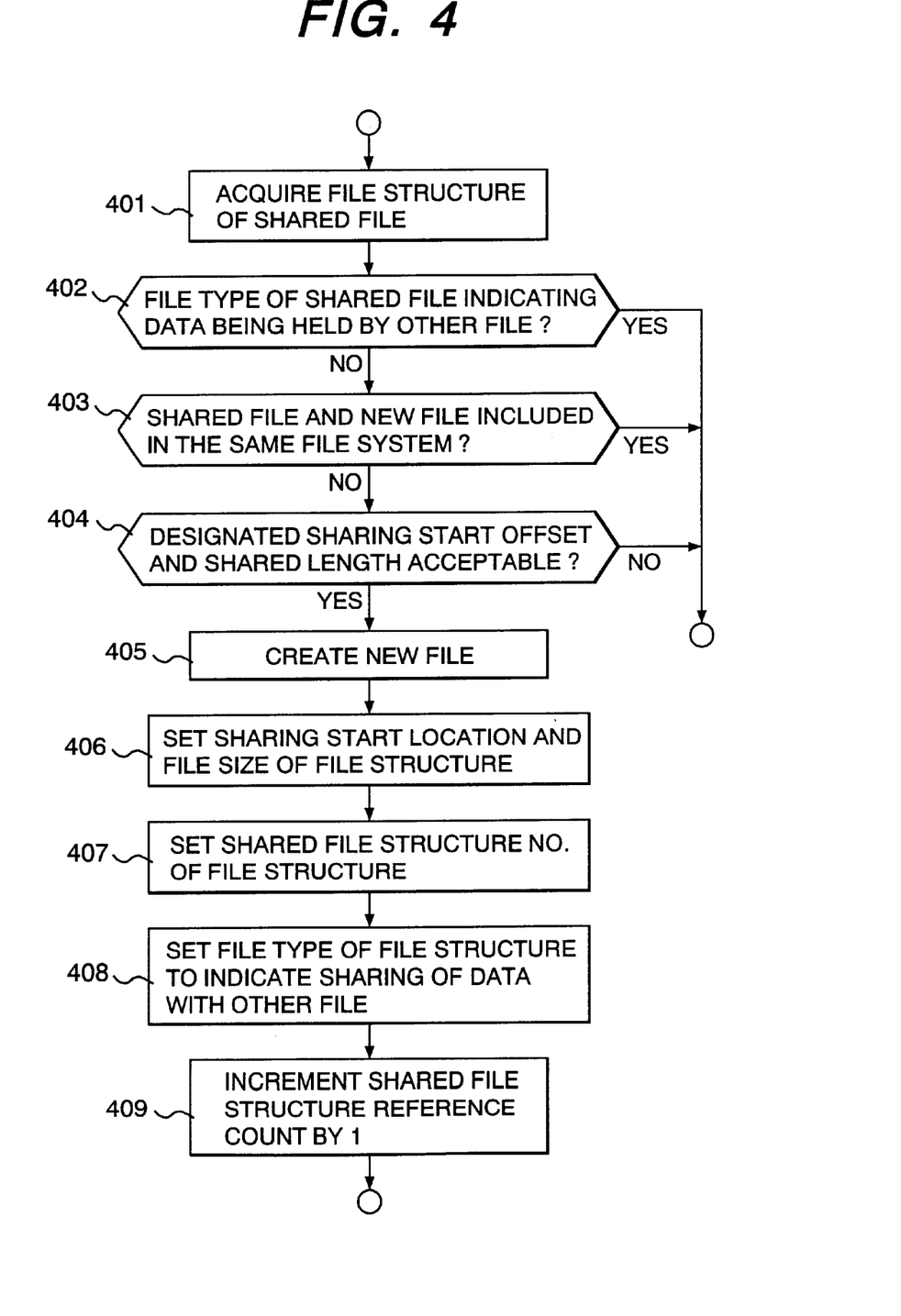
FIG. 4 is a flowchart of steps in which to name a file according to the invention.

FIG. 4 is a flowchart of steps constituting a procedure for giving a new name to a partial file. The procedure will now be described by referring to FIG. 4. Four items are designated for this procedure: a file name of a shared file whose contents are to be offered, a new file name to be given to part of the shared file, a shared file offset indicating the start of the sharing of the file contents, and a sharing length.

A file structure of the shared file is first acquired based on the shared file name designated for the procedure (step 401). For purpose of explanation, it is assumed here that the file structure of the shared file is identical to the file structure 230 in FIG. 2. In step 402, reference is made to the file type 231 of the file structure 230 obtained in step 401. A check is made to see if the file type indicates that the file contents are shared by another file. If that is the case, an error is recognized and the processing is brought to an end. Otherwise step 403 is reached.

In step 403, a check is made to see if the file name designated anew for the procedure indicates a file belonging to the same file system as that of the shared file. If the newly designated file name belongs to a different file system, an error is recognized and the processing is terminated. Otherwise step 404 is reached.

In step 404, a check is made to see if the sharing start offset designated for the procedure and the shared length are both acceptable. Specifically, an examination is made on whether the range represented by the designated values falls within the scope of the shared file. If the designated range is not judged acceptable, an error is recognized and the processing is terminated. Otherwise the next step for calculation is reached.

The next step creates an empty file corresponding to the new file name designated for the procedure (step 405). It is assumed that the file structure 270 is created as a new file. After this, a sharing start offset 276 and a file size 272 of the file structure 270 for the file created in step 405 are designated for the procedure (step 406). A shared file structure number 274 of the file structure 270 is set as the file structure number for the shared file structure 230 (step 407). A file type 271 of the file structure 270 is set for a value indicating that the file contents are shared by another file (step 408). Lastly, the reference count 235 for the file structure 230 of the shared file is incremented by 1.

The procedure above, when executed, gives a new file name to part of the file in creating the data structure shown in FIG. 2.

Figure 5:
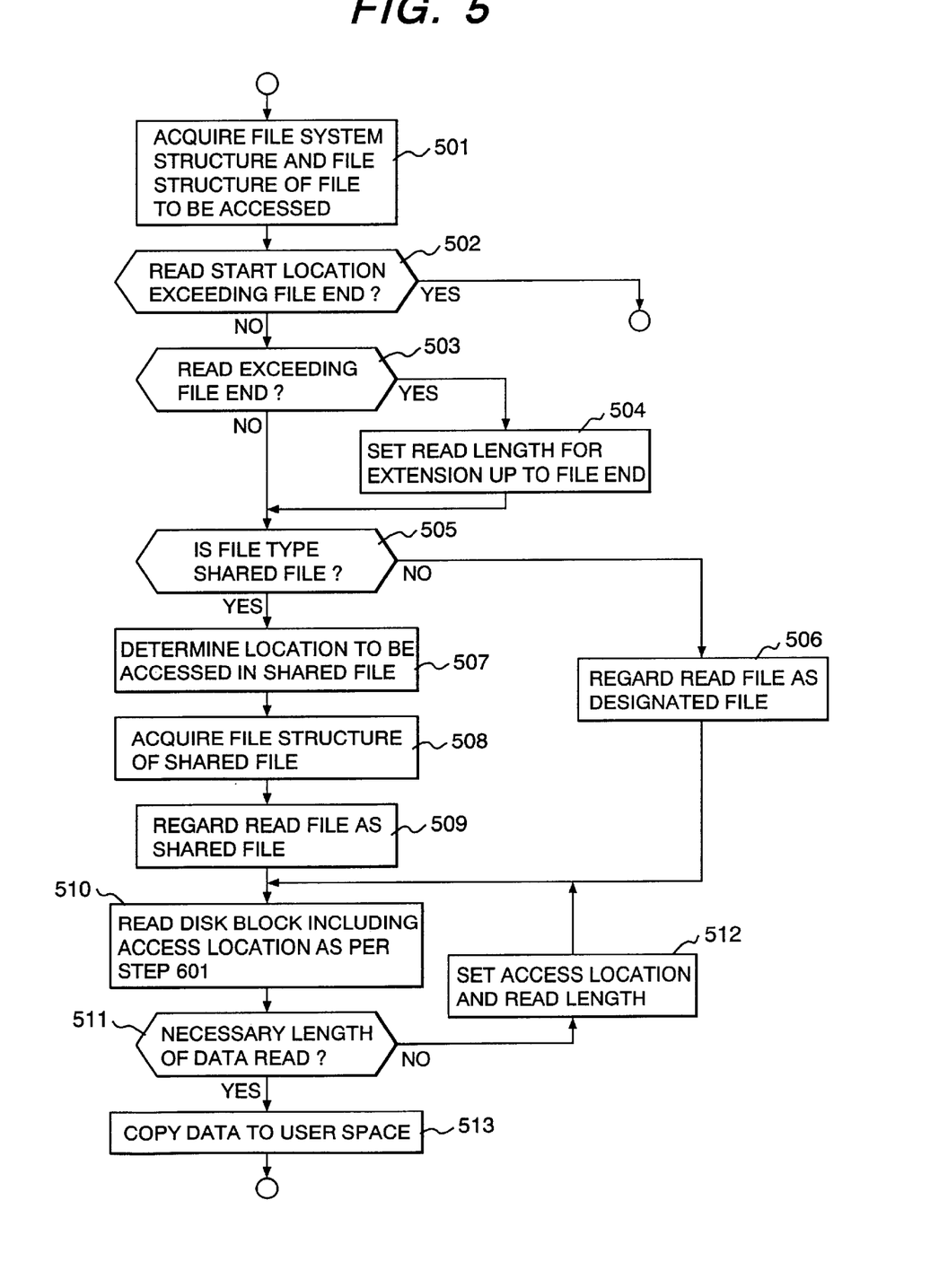
FIG. 5 is a flowchart of steps in which to read a file according to the invention.

FIG. 5 is a flowchart of steps constituting a procedure for reading a file. The program designates four items for the file system: a file name of a target file to be accessed, a file read start location, a read length, and a user space buffer. It is assumed here that the target file to be read is that which is represented by the file structure 270 in the file system denoted by the file system structure 200 of FIG. 2.

In step 501, the file system structure 200 of the target file and the file structure 270 are acquired. In step 502, a comparison is made between the file size 272 of the file structure 270 and the read start location designated for the procedure. If the read start location is found to exceed the file end, the read procedure is terminated. Otherwise step 503 is reached.

In step 503, a check is made, based on the access file read start location, read length, and the file size 272 of the file structure 270, to see if the read operation exceeds the end of the file represented by the file structure 270. If the read operation is judged to exceed the file end, step 504 is reached. Otherwise step 505 is reached.

In step 504, based on the file size 272 of the file structure 270 and on the read start location designated for the procedure, the read length for the access target file is modified and set for extension up to the file end. Step 504 is followed by step 505.

In step 505, the file type 271 of the file structure 270 is referenced so as to see if the contents of the file to be accessed are shared by another file. If the contents of the target file are not found to be shared by any other file, step 506 is reached. In step 506, the file to be read is regarded as the file designated for the procedure. Step 506 is followed by step 510. If the file contents are judged to be shared by another file, step 507 is reached. In this example, step 507 is reached because the file represented by the file structure 270 shares its contents with the file denoted by the file structure 230.

Step 507 determines, based on the read start location designated for the procedure and on the sharing start offset 276 of the file structure 270, a read start location in the file described in the file structure 230 sharing the actual file contents. Given the shared file structure number 274 of the file structure 270, the next step acquires the file structure number of the file structure 230 representing the file sharing the file contents, as well as the file structure 230 (step 508). The file to be accessed is regarded as the shared file (file structure 230 in this case) before step 510 is reached.

In step 510, the disk block including the access start location is read into a disk buffer in the main memory in accordance with a procedure from step 601 on, to be described later. The procedure starting from step 601 reads the entire disk block comprising the access target region irrespective of the read length designated for the procedure or of the read length obtained by readjustment as long as the access location is not the last block of the file. When the disk block is read by the procedure of FIG. 4 on the basis of a different name attached to a file portion, the whole disk block is read into the disk buffer even if the differently named file does not occupy the block in its entirety. In other words, a plurality of files to be accessed sequentially or multiple files that tend to be accessed in concentrated fashion may be arranged into a single file, the individual files being given a specific file name each. With this arrangement, gaining access to any one of the partial files causes the whole file to be prefetched.

In step 511, a check is made to see if data have been read over a length necessary for the current disk block read operation. If the data of the necessary length are found to be read, the necessary length is copied from the disk buffer to a buffer in the user space (step 513), and the file read procedure is terminated. Otherwise the access start location and the read length are modified (step 512), and step 510 is reached again.

In the above-described steps, a plurality of files to be accessed in succession or multiple small files that tend to be accessed in concentrated fashion are arranged into a single file. The whole file is read by use of the name of any one of the individual files making up the entire file. This allows a file or files different from the one viewed from the user's program, i.e., a plurality of files, to be prefetched in order to improve the cache hit rate of the file system, shorten the disk wait time, and reduce the number of disk access operations.

Figure 6:
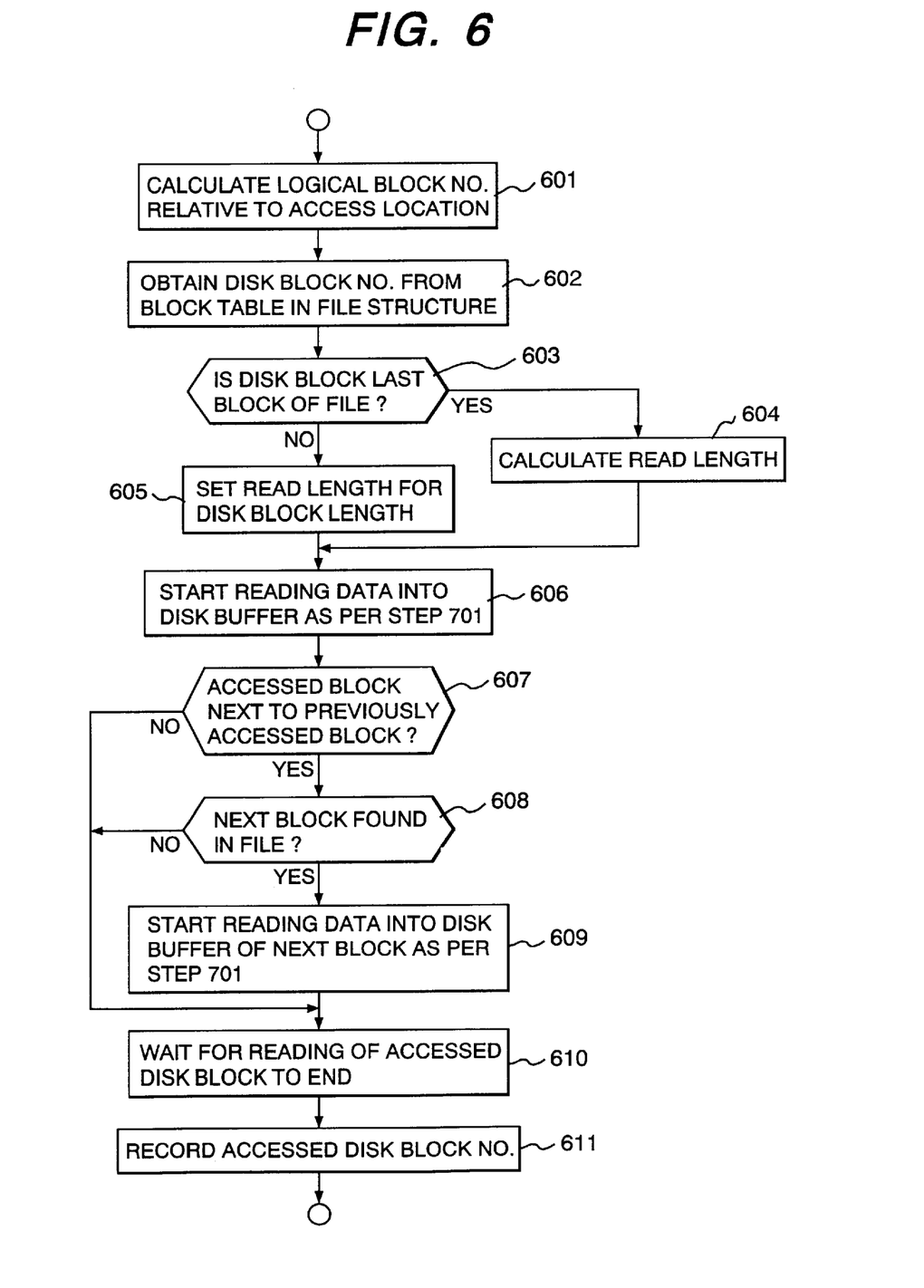
FIG. 6 is a flowchart of steps constituting a disk block read procedure of the invention.

A procedure for reading a disk block from disk into a disk buffer will now be described with reference to FIG. 6. For the procedure from step 601 on, it is assumed that a copy in the main memory of the file system structure for the file to be read is already furnished together with a file structure and a read start location. What follows is a description of how the file indicated by the file structure 230 is prefetched by this procedure.

A logical block number of the read start location is obtained from a disk block size 321 of the file system structure 320 for the file system wherein exist the furnished read start location and the file about to be read in (step 601).

A disk block number to be read from the logical block number acquired in step 601 is obtained by referring to a disk block table of the file structure 230 (step 602). A check is made to see if the acquired disk block is the last block assigned to the file in question (step 603). If that is the case, then the read length of the disk block is calculated (step 604). At the file end, a file region derived from the division of the disk block may have been allocated. In that case, the read length is readjusted on the basis of the file length included in the last block before step 606 is reached. If the obtained disk block is not the last block assigned to the file, the read length is set for the disk block length, and step 606 is reached.

In step 606, a procedure from step 701 on, to be described later, starts reading the disk block corresponding to the acquired disk block number into a disk buffer in the main memory 120.

A comparison is made between the logical block number of the disk block read into the main memory 120 on the one hand and the logical block number 233 of the previously read block on the other hand (step 607). If the logical block number of the disk block read this time indicates the disk block next to the preceding logical block number, the file access operation is assumed to be sequential and step 608 is reached. Otherwise step 610 is reached.

In step 608, a check is made on the disk block table of the file structure 230 to see if the file to be read comprises a logical block subsequent to the logical block that began to be read in step 606. If no subsequent logical block is found, step 610 is reached. Otherwise step 609 is reached.

In step 609, a disk block number of the logical block next to the logical block that began to be read in step 606 is acquired from the disk block table of the file structure 230. The procedure from step 701 on, to be described later, starts reading the disk block into the main memory, and step 610 is reached.

If any portion of the file to be read has a different name and if the current file access operation is based on that different name, the disk block to be prefetched is allowed to share contents of a file different from the access file designated by the user program. This means that contents of a file different from the user-requested access file can be prefetched into the disk buffer.

In step 610, completion of the read operation begun on the disk block in step 606 is awaited. In step 611, the logical block number obtained in step 601 is recorded to the last accessed logical block number 233 of the file structure 230.

Figure 7:
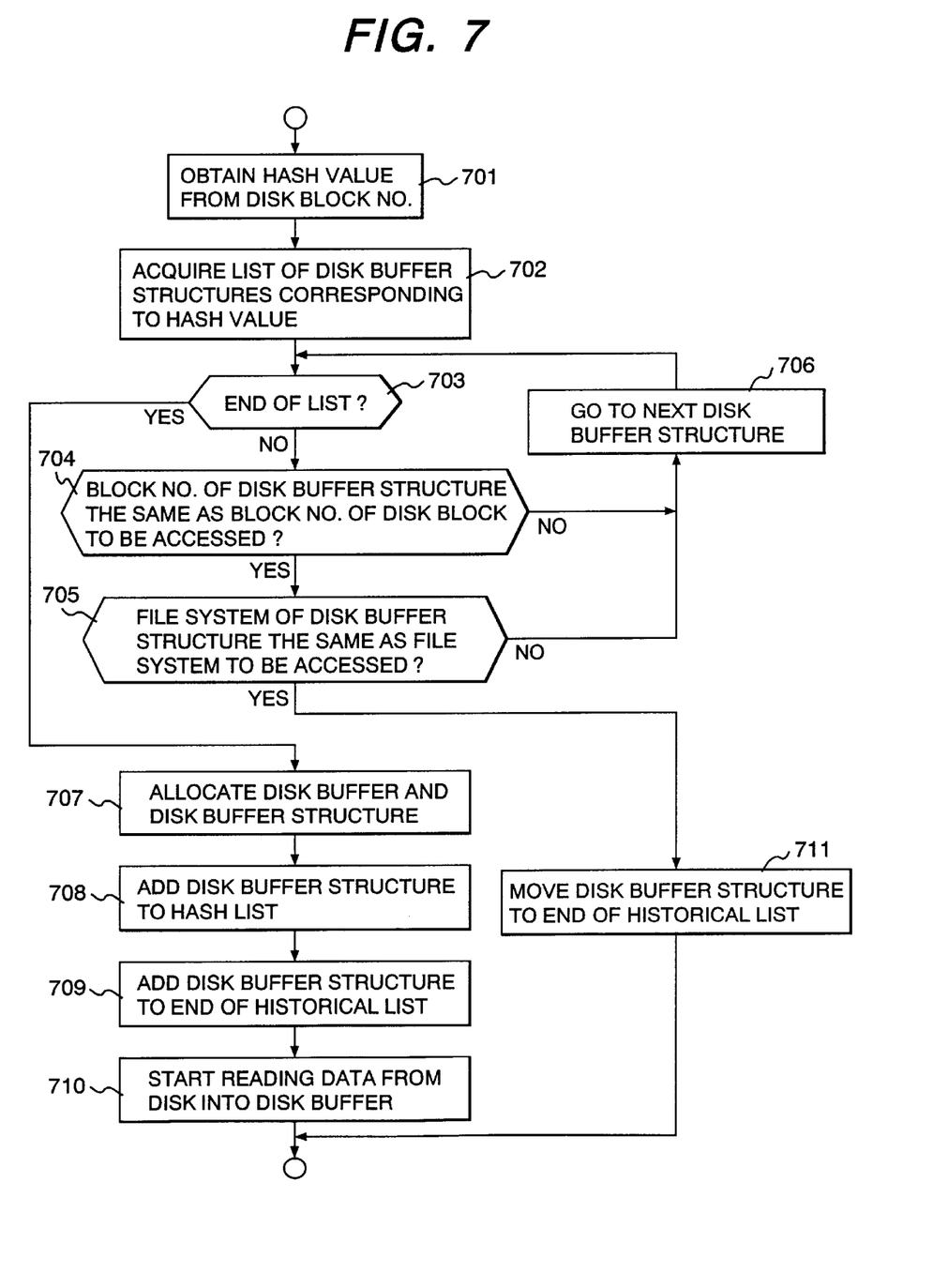
FIG. 7 is a flowchart of steps constituting a disk buffer management procedure for use in reading a file according to the invention.

FIG. 7 is a flowchart of steps constituting a procedure for transferring a disk block from disk into a disk buffer in the main memory. It is assumed that by the time step 701 is invoked, a disk block number of a disk block to be read, a read length of the block, and a file system structure have been designated.

Hash values are first calculated using as the key the disk block number of the disk block to be read (step 701). A hash list is acquired of a disk buffer structure corresponding to the obtained hash values (step 702).

Steps 703 through 706 are performed on each of the disk buffer structures included in the hash list obtained in step 702. In step 703, a check is made to see if there is any disk buffer structure left that needs to be processed. That is, step 703 checks to see if all disk buffer structures included in the list acquired in step 702 have undergone step 703 through 706. If no further disk buffer structure is judged to be left, step 707 is reached. Otherwise step 704 is reached.

In step 704, a comparison is made between the disk block number of the currently processed disk buffer structure and the disk block number of the disk block to be read. If the two numbers are found identical upon comparison, step 705 is reached. If the compared numbers prove to be different, the next disk buffer structure is acquired from the hash list (step 706), and step 703 is reached.

In step 705, a check is made to see if the pointer to the file system structure of the currently processed disk buffer structure is the same as the file system structure designated for the procedure. If the pointer and the structure are judged to be the same, step 711 is reached. Otherwise the next disk buffer structure is obtained from the hash list (step 706), and step 703 is reached.

In step 711, the detected disk buffer structure is temporarily removed from the access historical list 330 and moved to the end of the list 330. The procedure is then terminated.

More about the procedure is described below on the assumption that reference numeral 313 in FIG. 3 denotes a list of disk buffer structures corresponding to the hash values calculated in step 701 and that reference numeral 360 represents the disk buffer structure corresponding to the disk block to be accessed. The disk buffer structure 350 at the top of the list is checked first. A comparison is made in step 704 between the disk block number 351 of the disk buffer structure 350 and the disk block to be read. Because the disk buffer structure 350 does not correspond to the disk block to be read, there is no match and step 706 is reached. In step 706, a reference to a hash list link 354 of the disk buffer structure 350 leads to the next disk buffer structure 360. Because the disk buffer structure 360 corresponds to the disk block to be read, the disk block number 361 is equal to the read disk block number. A pointer 366 to the file system structure also points to the file system designated for the procedure, which allows step 711 to be reached. In step 711, the detected disk buffer structure 360 is removed from the access historical list 330 and attached to the end of the structure 380. The procedure is then terminated.

Below is a description of what takes place if the list acquired in step 702 has no disk buffer structure corresponding to the disk block to be read. In step 707, a new disk buffer per se is allocated together with a disk buffer structure. A disk block number of the disk buffer structure, a disk buffer size, a disk buffer pointer, and a file system pointer are set before step 708 is reached.

In the next step for calculation (step 708), the disk buffer structure is added to the hash list obtained in step 702. The disk buffer structure is added to the end of the access historical list 330 (step 709) before step 710 is reached.

In step 710, the disk drive is notified of the start of reading of the target disk block to the disk buffer allocated in step 707. This completes execution of the procedure.

Where a plurality of files having different file names are to be accessed consecutively, the above-described embodiment of the invention permits prefetching of a file region indicated by a file name different from the name of the file being read by the user program. This improves the cache hit rate of the file system, boosts the throughput of the file system, reduces the number of access operations to the secondary memory and thereby shortens the access wait time. There is no need for any specialized knowledge about the fact that a plurality of files having different file names are rendered into one file from the viewpoint of the user's program. The program thus needs no modification while benefiting from the prefetch of a plurality of files.

When multiple files are given different names before being rendered into a single file, disk block fragmentation is forestalled. Fragmentation of a disk block can occur in two cases: if the file is sufficiently small, and if the last portion of the file does not fit the disk block size. The fragmentation is prevented when a plurality of files are arranged into one file. This makes it possible to keep the access block size sufficiently large at disk access time, whereby deterioration of the file system performance is averted.

Where files are to be accessed consecutively, they are arranged into a single file while the regions for the individual files are given a file name each. This scheme helps control the allocated locations of disk blocks on disks. That is, mutually related files are prevented from dispersing over the disks so that the disk access time is shortened.

Another embodiment of this invention will now be described. The preceding embodiment was shown storing only file system structures and data structures of disk buffers into the main memory. Alternatively, copies of file structures may also be placed in the main memory. Upon access to such data structures, their copies in the main memory may be referenced. It is also possible to prepare a list of file structures similar to a list of disk buffer structures in order to provide the cache memory effect covering the file structures.

The preceding embodiment was shown having a file name designated for the file read procedure in order to check the file type during procedure execution. An alternative to this scheme is to prepare a file opening procedure for acquiring a file access identifier as per a file name. During execution of the file opening procedure, a check is made on the file type to find a file structure of the file that actually holds contents. Thereafter, a file read operation based on the identifier may gain direct access to the file holding the contents.

Figure 8:
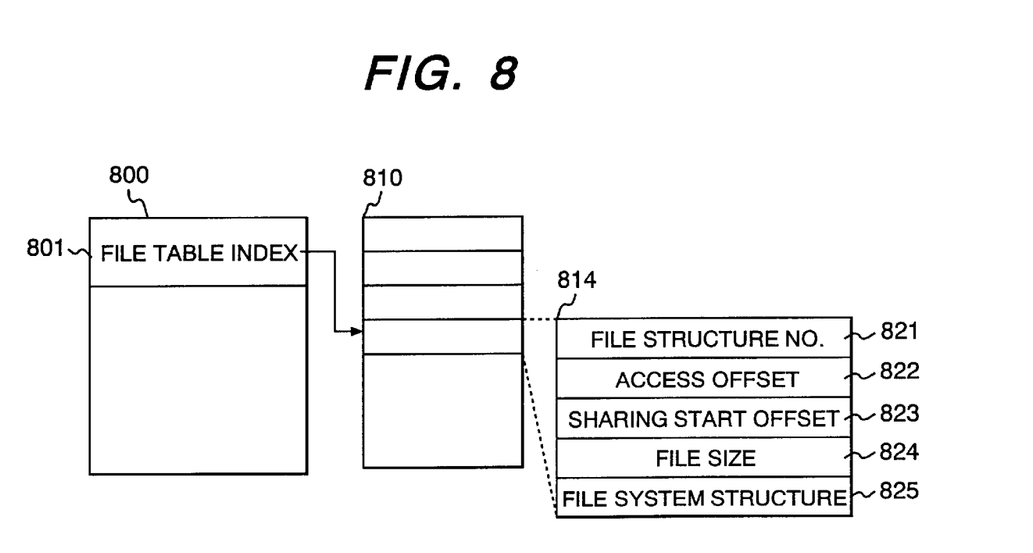
FIG. 8 is a schematic view indicating a data structure of a process according to the invention.

FIG. 8 is a schematic view indicating a data structure of the alternative process above. How to open a file indicated by the file structure 270 in FIG. 2 is described below. It is assumed that each process in the computer system has a process file table 800 containing information about the file opened by the process in question and that the kernel of the operating system has a kernel file table 810 holding information about the file opened by the process in the system.

Entries in the process file table correspond to entries in the kernel file table. Where the file indicated by the file structure 270 is to be opened, the process file table 800 and kernel file table 810 are first assigned an entry each (801 and 814 in the example of FIG. 8). The entry 801 assigned to the process file table 800 is arranged to point to the entry 814 allocated to the kernel file table 810.

The entry 814 in the kernel file table comprises: a file structure number 821 of the file opened by the process, an access start offset 822 for the next file access operation, a sharing start offset 823, a file size 824, and a pointer 825 to a copy in the main memory of the file system structure that includes the file. When contents of the opened file are shared by another file, the sharing start offset 823 indicates where the shared contents start in the different file. The file size 824 represents the size of the currently opened file.

Because the file structure 270 has its contents shared by another file, the access offset 822 and sharing start offset 823 are set for the value of the offset 276, the file size 824 is set for the value of the size 272, and the file structure number 821 is set for the value of the structure number 274. When the process reads a file through the entry 801 in the process file table 800, a file structure is obtained from the file structure number 821. The procedure from step 501 on in the flowchart of FIG. 5 is allowed to start reading data from the access offset 822 until the file size 824 is exhausted. At the end of the read operation, the access start offset 822 is set for a value such that the next file access will begin from behind the currently read region. The sharing start offset 823 retains a file start location in preparation for a random access operation that may occur on the file.

With the embodiments described above, an error is recognized if, when a part of a file is given a different file name A, a file name B of the shared file is also the name of a portion of another file C. Alternatively, it is possible, with no error recognized, to compute a sharing start offset of a file A in a file C by referencing the sharing start offset and file size of a file structure corresponding to a file name B. In such a case, a file name given to part of a file may also be regarded as a different name of the shared file.

The embodiments above were shown judging sequential access to files on the basis of the logical block number of the previously accessed block. Alternatively, the judgment may be made by retaining an intra-file offset of the file that was read in the last file read operation and by comparing the retained offset with the access start offset of the file to be accessed next.

For the embodiments discussed above, a single disk block was assumed to be prefetched. Alternatively, a plurality of disk blocks may be prefetched. For example, a file structure may be arranged to contain a region in which to record whether sequential access has been detected in the preceding file read operation. If sequential access is detected upon reading of a file and if the recorded preceding file read operation is found to have been sequential as well, then a plurality of disk blocks may be arranged to be prefetched. Prefetching of multiple disk blocks may be accomplished by first checking see, between steps 608 and 609 in FIG. 6, whether there is a continuation of sequential access. If that is the case, then a plurality of logical block may be read in step 609. From the consecutive prefetching of a plurality of disk blocks, two benefits can be expected: a reduced number of input and output operations thanks to the collective issuing of physical input and output commands, and a shortened disk access time stemming from prefetching on the disk controller side.

Figure 9:
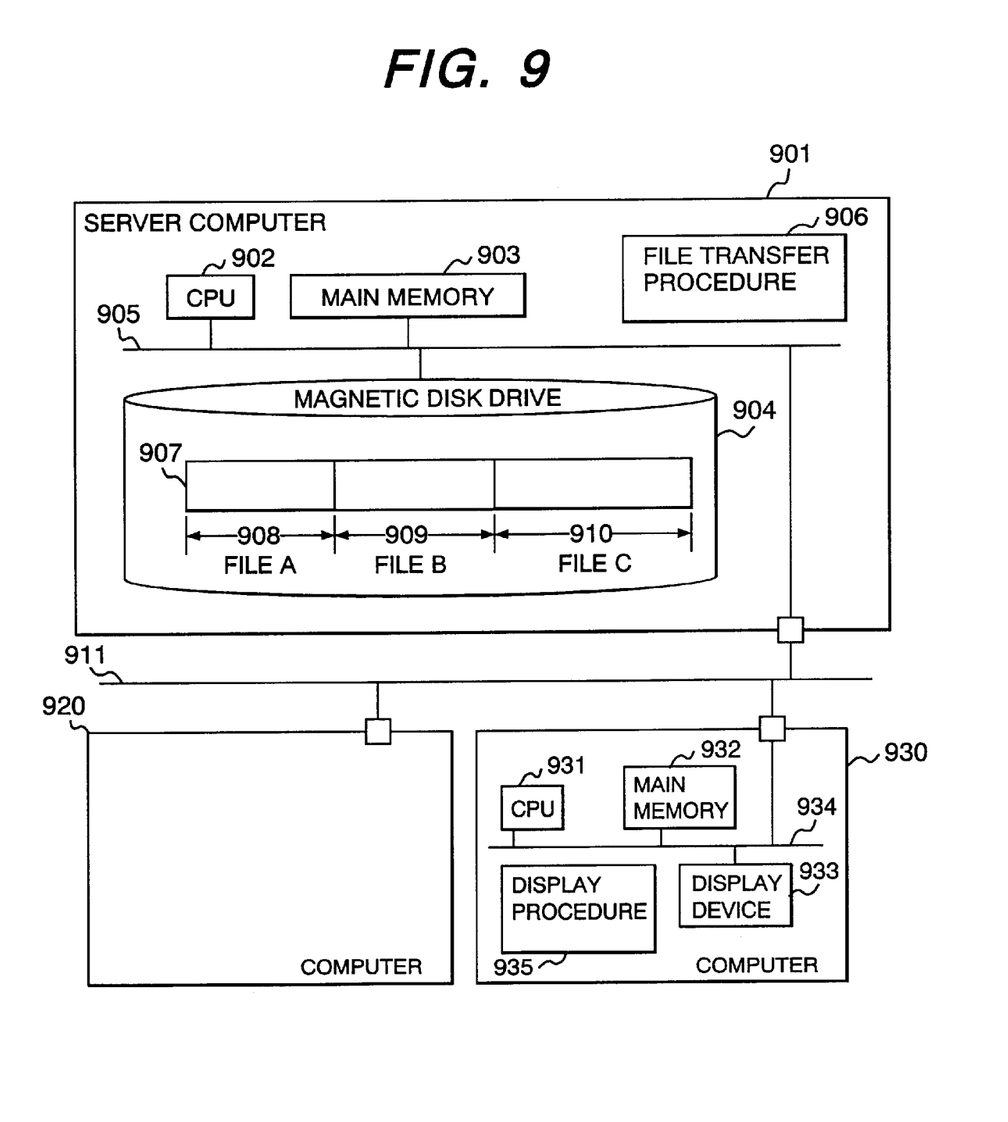
FIG. 9 is a block diagram of a computer system to which the invention is applied.

What follows is a description of how this invention may be applied to a server that provides clients with composite documents comprising not only text but also images. The methods used here for displaying and transferring composite documents are the same as those applied to the WWW (World Wide Web). The WWW is discussed in detail illustratively in "Communications of ACM" (Vol. 37, No. 8, pp. 76–82, from ACM Press, 1994). FIG. 9 is a block diagram of a computer system to which the invention is applied.

A computer 901 acting as the server comprises a CPU 902, a main memory 903, and a magnetic disk drive 904 which are interconnected by a bus 905. A network 911 connects the computer 901 to computers 920 and 930 acting as clients. On the computer 901, a file transfer procedure 906 is carried out to process file transfer requests from the client computers. In response to a file transfer request from a client, the file transfer procedure 906 transfers the requested file from the magnetic disk drive 904 to the client.

The magnetic disk drive 904 contains composite documents. A composite document comprises a composite document file defining the composite document in question, and a plurality of image files retaining image data included in the composite document. The composite document file records file names of image data files included in the composite document. In this example, a composite document is assumed to comprise a composite document file A and image data files B and C. The file A has records indicating that the composite document includes the files B and C.

The computer 930 that acts a client comprises a CPU 931, a main memory 932 and a display device 933 which are interconnected by a bus 934. The network 911 connects the computer 930 to the server computer 901. On the computer 930, a display procedure 935 is carried out for the display of a composite document. The computer 920 has the same constitution as the computer 930.

Figure 10:
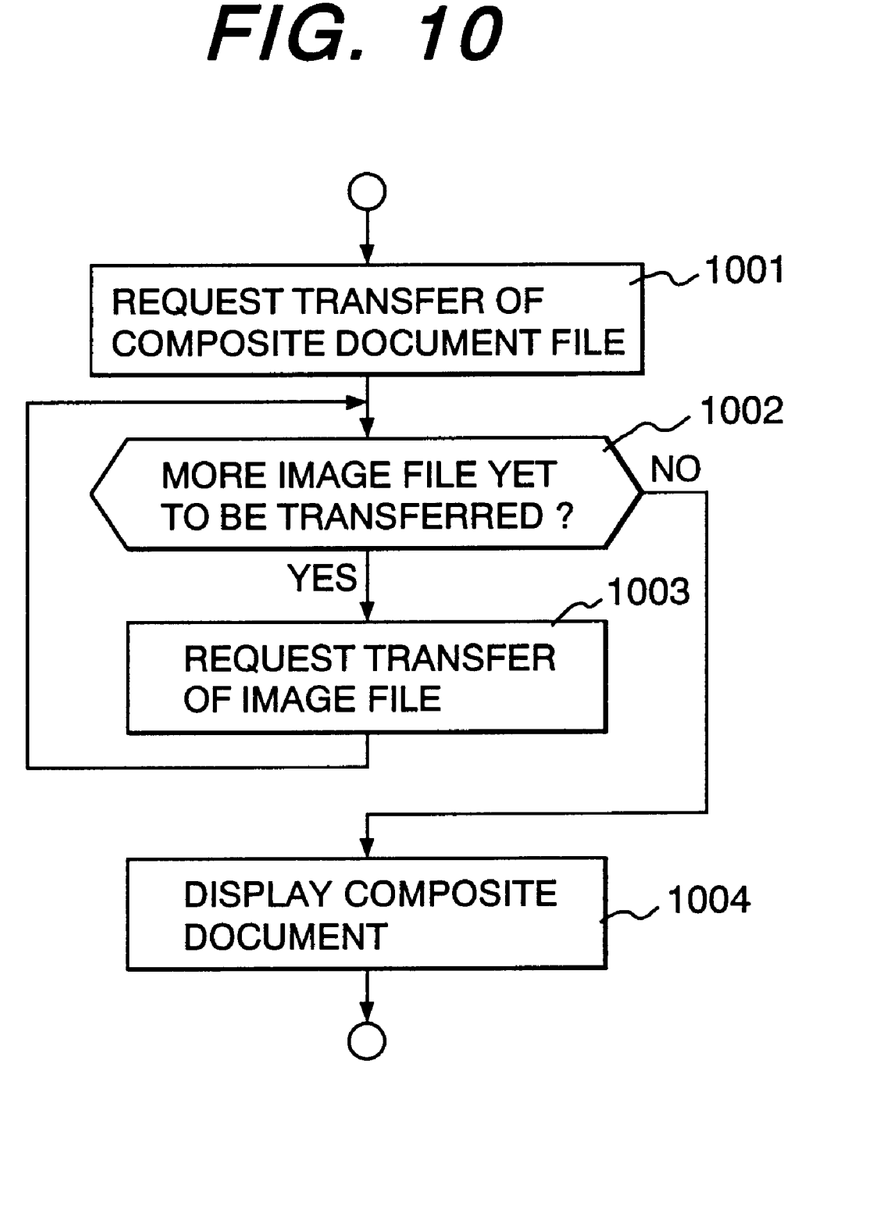
FIG. 10 is a flowchart of steps constituting a composite document display procedure to which the invention is applied.

Steps to display the composite document made up of the files A, B and C will now be described with reference to the flowchart of FIG. 10. The display procedure 935 first requests the server computer 901 to transfer the composite document file A holding the composite document to be displayed (step 1001). The file transfer procedure 906 running on the server computer 901 receives the request from the client, and transfers the requested file A to the client computer 930.

On receiving the composite document file A, the display procedure 935 in the client computer reads contents of the file A to see if any image file is included in the document (step 1002). If an image file is found to be included, step 1003 is reached in which an image file transfer request is issued to the server computer 901. Since the file A comprises the image files B and C, a request to transfer the files B and C is sent to the server computer 901. In response, the file transfer procedure 906 in the server computer transfers the files B and C to the client computer 930. Upon receipt of the image files, the display procedure 935 reconstitutes a composite document display screen based on the text data file A and on the image data files B and C, and displays the screen thus prepared onto the display device 933 (step 1004).

During the file transfer above, it is readily surmised that the transfer of the files B and C will be requested following the transfer of the file A. However, a conventional file system prefetch facility prefetching only one file is incapable of prefetching the files B and C despite the fact that the file A has been read in a sequential access operation by the file transfer procedure 906. According to the invention, the files A, B and C constituting a composite document such as is shown in FIG. 9 are arranged into a single file 907. Portions 908, 909 and 910 constituting the file 907 are given file names A, B and C respectively. Under the inventive scheme, a sequential access operation on the file A triggers prefetch of the files B and C. This improves the throughput of the file system on the side of the server computer, shortens the time required for file transfer processing, and reduces the time it takes for the client computer to display a composite document.

INDUSTRIAL APPLICABILITY

As described, the inventive file prefetch control method for use with a computer system is effective in prefetching a plurality of files. The method offers improvements in the cache hit rate of a plurality of files that tend to be read consecutively. This contributes to implementing a high-performance computer system.

What is claimed is:

1. A file prefetch control method for accessing a file system in a computer system, comprising the steps of:

reading a plurality of files to be combined to constitute a combined file, from said file system;

storing the read plurality of files in said file system, as a series of said files, contents of each of said files constituting a partial file in said combined file;

naming each of the partial files for identifying from other files;

converting a request using a name of the partial files to access any one of said partial files; to a request to access said combined file; and access the requested partial file executing said request to access said combined file.

2. A file prefetch control method for accessing a file system in a computer system, comprising the steps of:

reading a plurality of consecutive files from said file system;

storing the read plurality of files in said file system, as a series of said consecutive files, contents of each of said files constituting a partial file in said combined file;

naming each of the partial files for identifying from other files;

converting a request using a name of the partial files to access any one of said partial files to a request to access said combined file; and access the requested partial file executing said request to access said combined file.

3. A file prefetch control method according to claim 1, further comprising the steps of:

naming said combined file for identifying from other files;

wherein, the accessing step accesses the requested partial file based upon the name of said combined file.

4. A file prefetch control method according to claim 2, further comprising the step of:

naming said combined file for identifying from other files;

wherein, the accessing step accesses the requested partial file based upon the name of said combined file.

* * * * *